April 13, 1965 E. S. FIRESTONE ETAL 3,177,740
INDEXING FIXTURE
Filed Oct. 28, 1963 2 Sheets-Sheet 1

INVENTORS
EUGENE S. FIRESTONE
CHRIS SKOUSGAARD
BY
ATTORNEYS

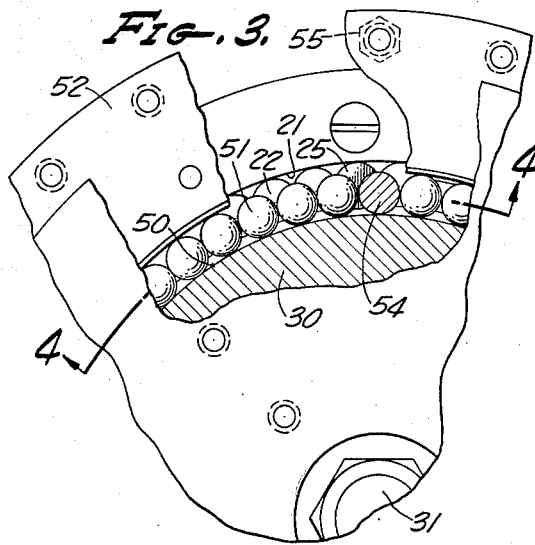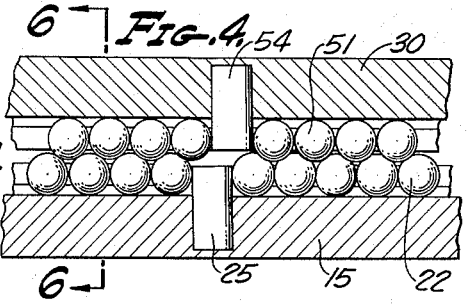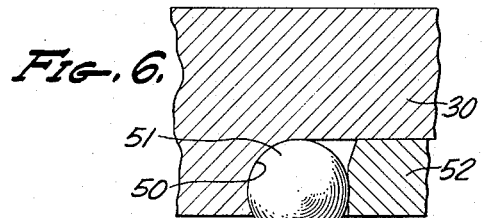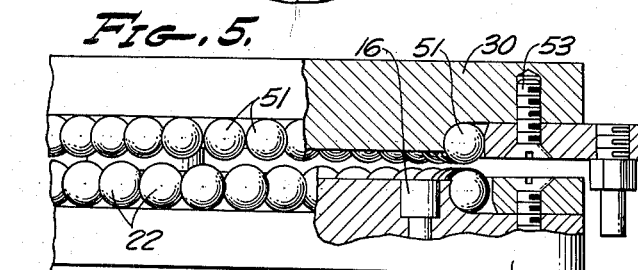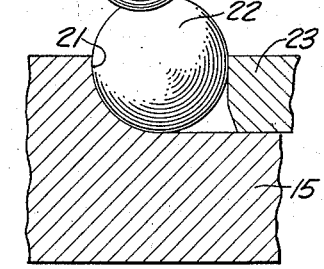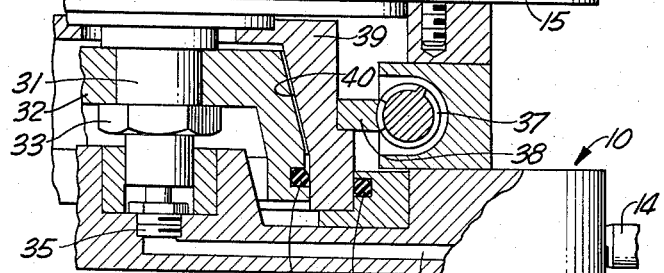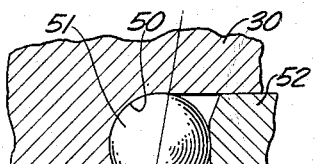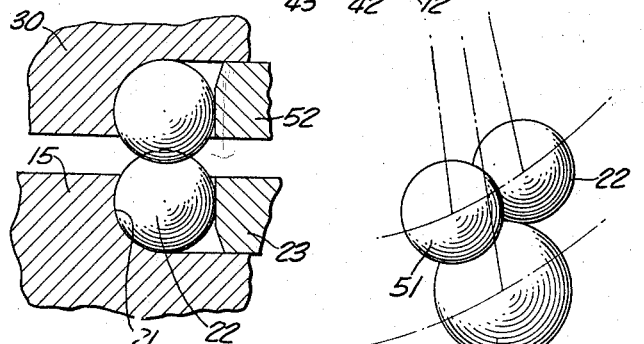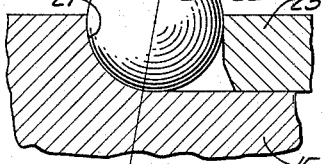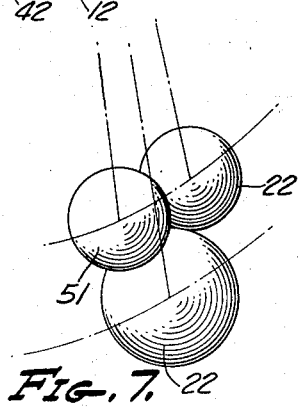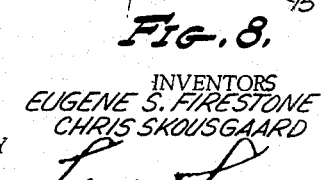

3,177,740
INDEXING FIXTURE
Eugene S. Firestone, North Hollywood, and Chris Skousgaard, Lake Arrowhead, Calif.; said Skousgaard assignor to Eugene S. Firestone, doing business as E. S. Firestone Engineering Co.
Filed Oct. 28, 1963, Ser. No. 319,123
2 Claims. (Cl. 74—826)

This invention relates to an indexing fixture and more particularly to a device for intermittently advancing a table from position to position and truly and accurately fixing the table in the desired position.

The invention is characterized by the use of two tables, one of which is fixed and one of which is the movable table, each table containing a race filled with a circle of accurately formed balls, the balls contained in the upper movable table being designed to contact the balls in the lower or fixed table for accurately positioning the upper table.

It is a further feature of this invention that the circle of balls in the movable table may be of greater or lesser diameter than the circle of balls in the fixed table and that the size of the balls in the movable table can be correspondingly larger or smaller than the balls in the fixed table.

It is a further feature of this invention that a constantly driven member is selectively engaged by a clutch mechanism which is air actuated to drive the movable table as desired.

These and other objects, features and advantages will be apparent from the annexed specification in which:

FIGURE 3 is a fragmentary top plan view with parts broken for clarity of illustration and partly in section;

FIGURE 4 is a section taken along line 4—4 of FIGURE 3;

FIGURE 5 is a fragmentary view similar to FIGURE 1 with the top table raised;

FIGURE 6 is a section taken along the line 6—6 of FIGURE 4; and

FIGURES 7, 8 and 9 are schematic drawings illustrating the possible relationships of the balls.

Figure 1:
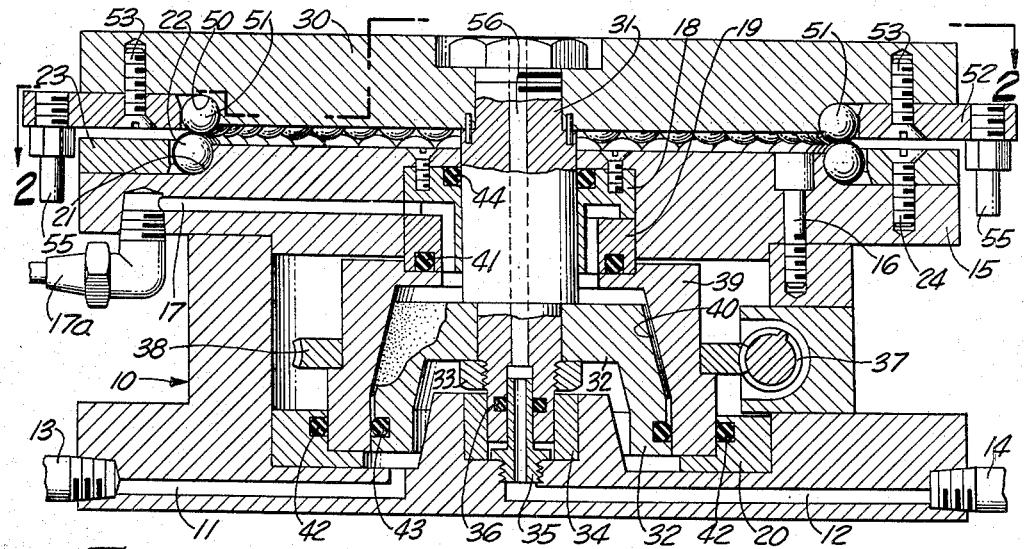
FIGURE 1 is a central vertical section through a device embodying the present invention.
Figure 2:
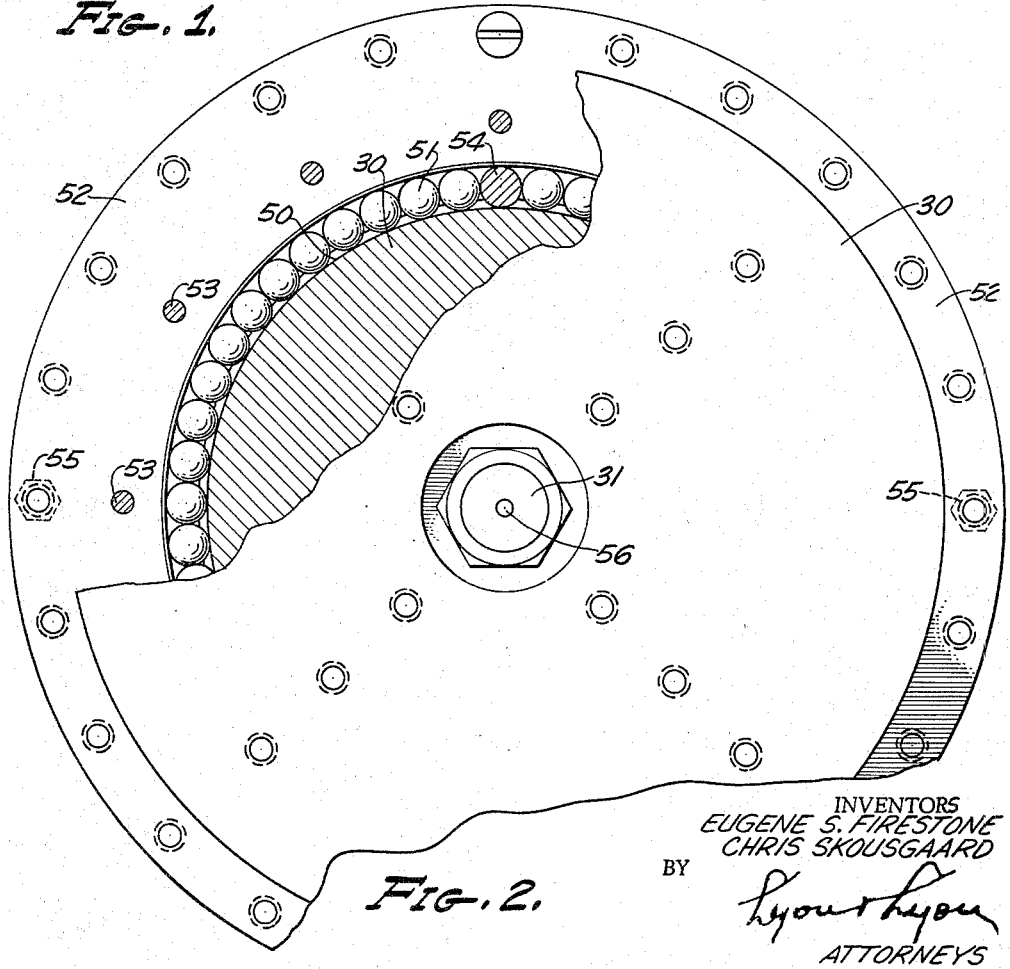
FIGURE 2 is a view taken along the line 2—2 of FIGURE 1. It is a top plan view with the parts broken away for clarity of illustration and partly in section.

Referring now more particularly to the drawings, the device includes a stationary base 10 which is made of several pieces for ease of manufacture and includes air passages number 12 communicating with fittings 13 and 14. Fixed to the base 10 is a stationary plate 15 affixed thereto by any suitable manner such as the cap screws 16. The plate 15 is provided with an air passage 17 communicating with a fitting 17a. Mounted in the plate 15 is a bearing ring 18 and a second bearing ring 19. A bearing ring 20 is mounted in the base 10 as shown. The upper edge of a stationary plate 15 is provided with a peripheral groove 21, the inner boundary of which is curved and a series of balls 22 is mounted in the groove and retained therein by retaining ring 23 secured to the plate 15 by screws 24. The series of balls are contiguous to each other except that somewhere throughout the circle there is a peg 25 having the same diameter as the balls in a fixed position to assure that the balls remain in a fixed position and do not move.

A movable plate 30 is provided which plate may be designed to carry any desirable fixture which it is desired to move step by step, such as for instance, a collet or the like. The plate 30 is affixed to a post 31 which is itself affixed to a clutch 32 by means of a nut 33 received on a threaded reduced portion of the post 31, which reduced portion is received in a bearing 34 mounted in base 10. Air passage 12 communicates with a stem 35 threaded into base 10 and having an O-ring 36 sealing the stem to the interior post 31. Also mounted in the base 10 is a worm gear 37 continuously driven by any suitable means such as an electric motor not shown which engages a gear 38 carrried by a member 39 which is itself also continuously driven. Member 39 has a frusto conical section 40. An O-ring 41 seals the bearing ring 19 to the member 39 and an O-ring 42 seals the member 39 to the bearing ring 20. A clutch 32 carries an O-ring 43 and seals it to the rotating member 39. An O-ring 44 seals the bearing ring 18 to the post 31. Plate 30 has an annular groove 50 at its periphery, the inner wall of which is likewise grooved. A series of balls 51 are retained therein by a ring 52 secured to the plate 30 by screws 53. The balls 51 are held in fixed position by a retaining peg 54 having the same diameter as the balls 51. The retaining ring 52 extends outwardly from the plate 30 and is tapped at regular intervals to selectively receive stop pins 55.

The operation of the above-identified device is as follows: When it is desired to advance the movable plate 30 air is passed through the air passage 11 to the underside of clutch 32 causing the same to move upward and have its frusto conical section 56 engage the frusto conical portion of rotating member 39. The movable clutch 32 thus causes the plate 30, post 31 and associated mechanism to be engaged and to rotate the plate 30, having been raised sufficiently to clear the balls 51 from engagement with the balls 22 as shown in FIGURE 5. This will permit the turning of plate 30 until stop 55 engages the shut off mechanism not shown which will permit the air to bleed out of the passage 11 as air is supplied to the passage 17 and thus to the upper side of the clutch to disengage the clutch and return the table into engaged position, the table being truly and accurately positioned by the balls in the upper plate 30 engaging balls 22 in the fixed plate. As shown in FIGURES 6, 7, 8 and 9 the balls may be of larger or smaller size and the radius of the circle of the balls may be of larger or smaller size or of the same size and yet because of the fact that merely a point contact is made the positioning of the plate will always be done with extreme accuracy.

Air passage 12 is provided to pass air through stem 35 to a central bore 56 which thus makes available to the movable plate air pressure for actuating any mechanism that may be carried by the plate 30 such as hydraulically operated collets or the like.

While there has been described what is at present considered the preferred embodiment of the present invention, it will be appreciated by those skilled in the art that various changes and modifications can be made therein without departing from the essence of the invention and it is intended herein to cover all such changes and modifications as come within the true spirit and scope of the appended claims.

We claim:

1. An indexing mechanism comprising: a stationary member; a member rotatable about a fixed axis; a circular groove in said stationary member; a series of balls seated in said groove; a circular groove in said rotatable member; the radius of said circular groove in said stationary member being different from the radius of said circular groove in said rotatatable member; a series of balls in said groove in said rotatable member, the balls in said stationary member and said rotatable member facing each other for indexing and positioning contact to fix said rotatable member with respect to said stationary member; a drive mechanism for said rotatable member; a clutch for releasably engaging said rotatable member with said drive mechanism, said clutch means being operable to lift said rotatable member and its associated balls out of contact with said stationary member and its associated balls on engagement of said clutch and stop means carried by said rotatable member for releasing said clutch and returning said rotatable member into ball contacting position with the balls associated with said stationary member.

2. An indexing mechanism comprising: a stationary member; a member rotatable about a fixed axis; a circular groove in said stationary member; a series of balls seated in said groove; a circular groove in said rotatable member; the radius of said circular groove in said stationary member being different from the radius of said circular groove in said rotatable member; a series of balls in said groove in said rotatable member, the balls in said stationary member and said rotatable member facing each other for indexing and positioning contact to fix said rotatable member with respect to said stationary member; the diameter of the balls associated with said stationary member being different from the diameter of the balls in said rotatable member; a drive mechanism for said rotatable member; a clutch for releasably engaging said rotatable member with said drive mechanism, said clutch means being operable to lift said rotatable member and its associated balls out of contact with said stationary member and its associated balls on engagement of said clutch and stop means carried by said rotatable member for releasing said clutch and returning said rotatable member into ball contacting position with the balls associated with said stationary member.

References Cited by the Examiner
UNITED STATES PATENTS

| | | | |
|---|---|---|---|
| 2,934,978 | 5/60 | Estabrook | 74—826 X |
| 3,088,340 | 5/63 | Shotey | 74—813 |
| 3,091,133 | 5/63 | Hoeger | 74—826 |
| 3,091,134 | 5/63 | Thompson et al. | 74—826 |
| 3,091,135 | 5/63 | Thompson | 74—826 |

BROUGHTON G. DURHAM, *Primary Examiner.*